US012583147B2

(12) United States Patent
Lanfant et al.

(10) Patent No.: US 12,583,147 B2
(45) Date of Patent: Mar. 24, 2026

(54) METHOD FOR PRODUCING A BLADED COMPONENT FOR AN AIRCRAFT TURBINE ENGINE

(71) Applicant: SAFRAN, Paris (FR)

(72) Inventors: Nicolas Pierre Lanfant, Moissy-Cramayel (FR); Sebastien Pautard, Moissy-Cramayel (FR)

(73) Assignee: SAFRAN, Paris (FR)

( * ) Notice: Subject to any disclaimer, the term of this patent is extended or adjusted under 35 U.S.C. 154(b) by 21 days.

(21) Appl. No.: 18/717,869

(22) PCT Filed: Dec. 6, 2022

(86) PCT No.: PCT/FR2022/052257
§ 371 (c)(1),
(2) Date: Jun. 7, 2024

(87) PCT Pub. No.: WO2023/105155
PCT Pub. Date: Jun. 15, 2023

(65) Prior Publication Data
US 2025/0050546 A1     Feb. 13, 2025

(30) Foreign Application Priority Data
Dec. 9, 2021     (FR) ...................................... 2113202

(51) Int. Cl.
B29B 11/14          (2006.01)
B29D 99/00          (2010.01)
D03D 25/00          (2006.01)

(52) U.S. Cl.
CPC .......... B29B 11/14 (2013.01); B29D 99/0025 (2013.01); D03D 25/005 (2013.01)

(58) Field of Classification Search
CPC . F01D 5/282; F01D 5/28; B29B 11/14; B29D 99/0025
See application file for complete search history.

(56) References Cited

U.S. PATENT DOCUMENTS

| | | | |
|---|---|---|---|
| 8,846,147 B2 * | 9/2014 | Eberling-Fux ...... | C04B 35/6286 |
| | | | 427/292 |
| 9,162,750 B2 * | 10/2015 | Coupe .................... | B64C 11/26 |

(Continued)

FOREIGN PATENT DOCUMENTS

WO          2013/088040 A2      6/2013

OTHER PUBLICATIONS

International Search Report and Written Opinion received for PCT Patent Application No. PCT/FR2022/052257, mailed on May 9, 2023, 13 pages (6 pages of English Translation and 7 pages of Original Document).

*Primary Examiner* — Michael L Sehn
(74) *Attorney, Agent, or Firm* — WOMBLE BOND DICKINSON (US) LLP

(57)          ABSTRACT
A method for producing a bladed component for an aircraft turbine engine, this bladed component comprising including a blade which has a stacking axis and at least one longitudinal end of which is connected to a transverse platform, the method including the steps of: a) producing a fibrous preform, this preform including a first part that is intended to form a blade and at least one second part that is intended to form a platform, this second part of the preform including a disconnect that defines two stacked portions that are separated by a disconnect surface that is substantially parallel to the axis, b) folding the portions, respectively, on two opposing sides of the first part, and c) stiffening the preform.

10 Claims, 7 Drawing Sheets

(56)                   References Cited

U.S. PATENT DOCUMENTS

| 10,532,521 | B2 | 1/2020 | Lanfant et al. |
| 11,141,938 | B2 | 10/2021 | Lanfant et al. |

* cited by examiner

[Fig.1]
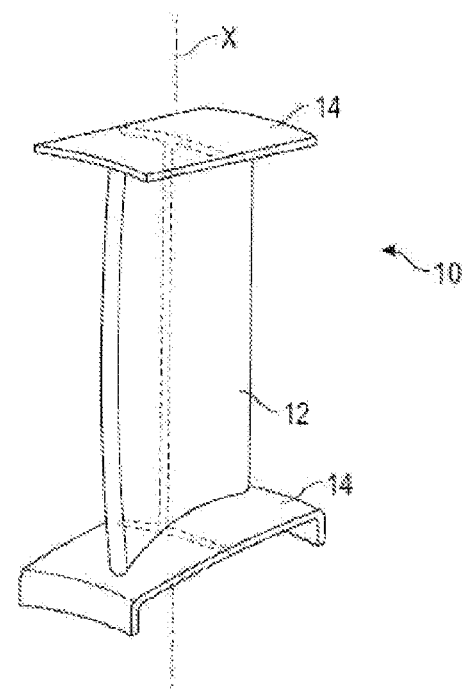
[Fig.2]
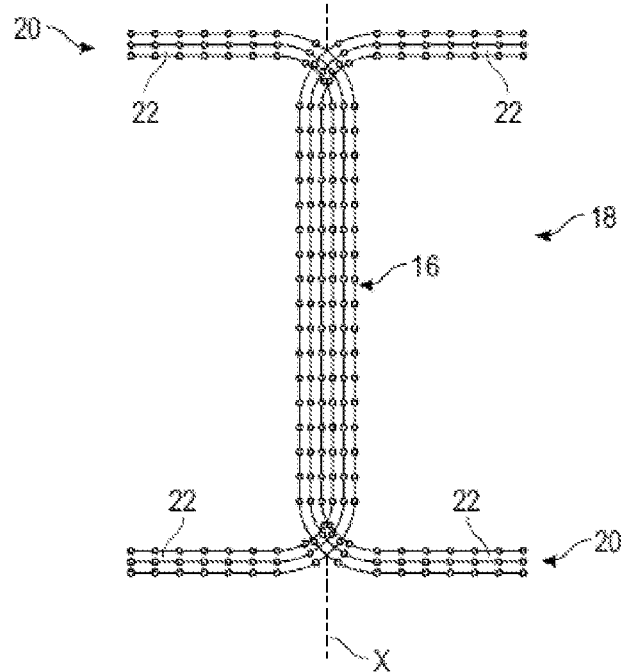

[Fig.3a-3b]
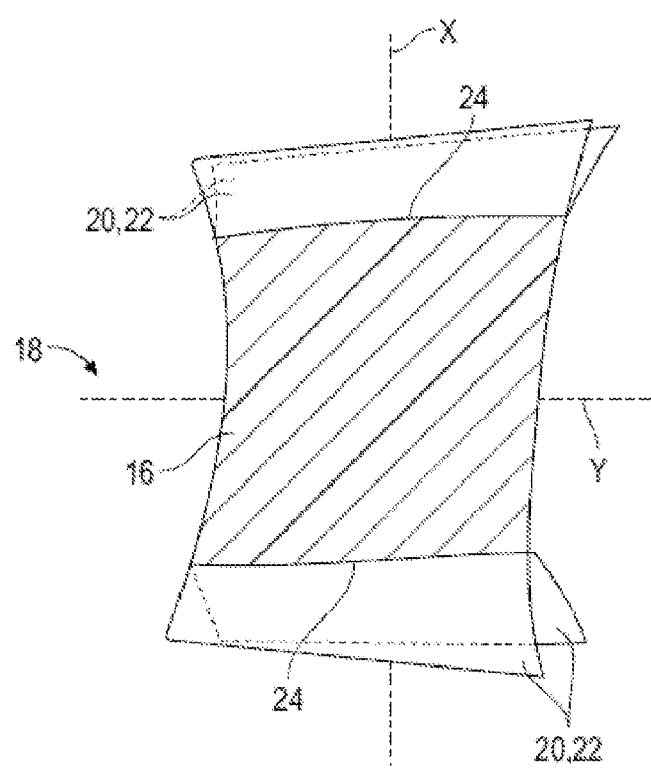
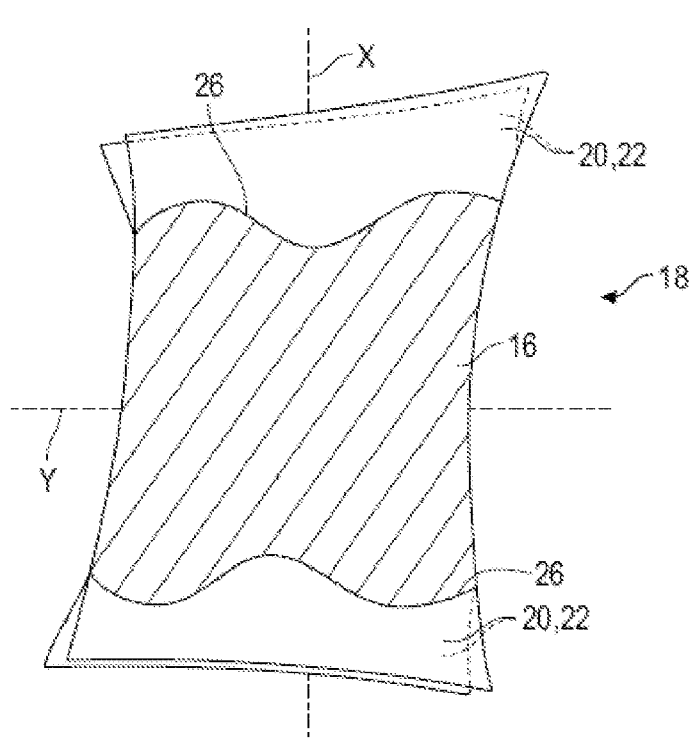

[Fig.4]
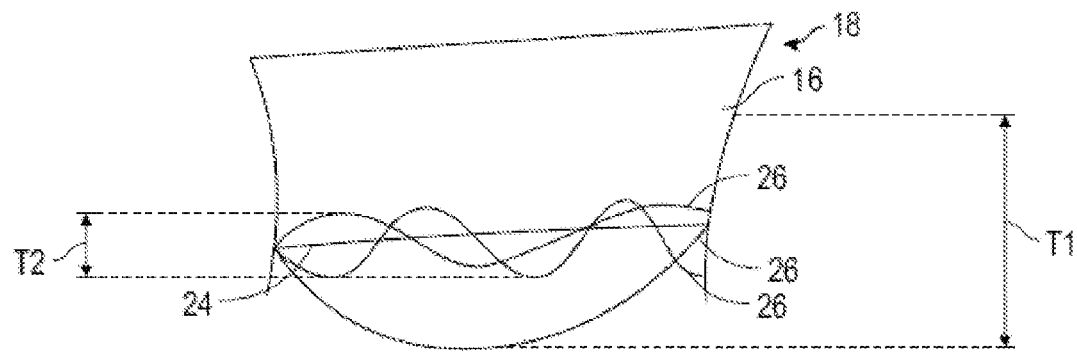

[Fig.5a-5b]
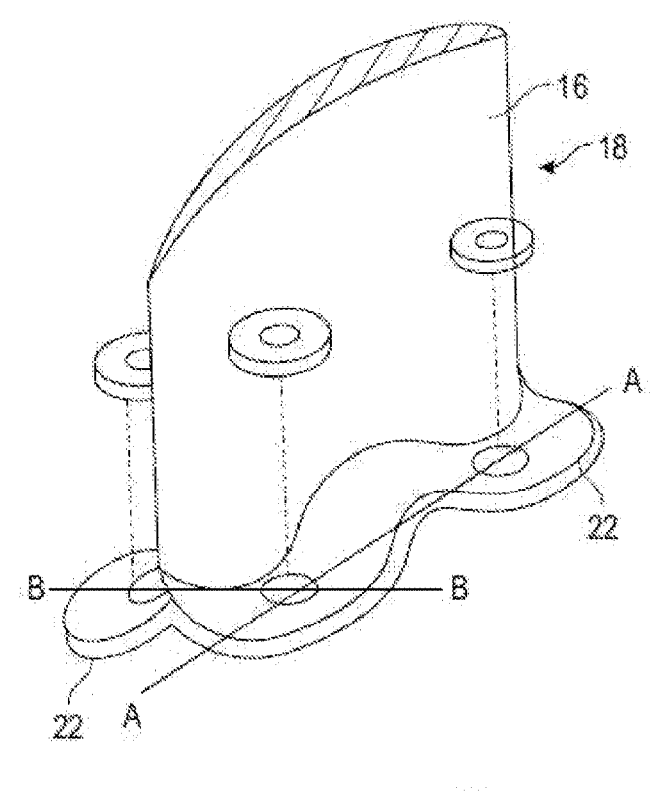
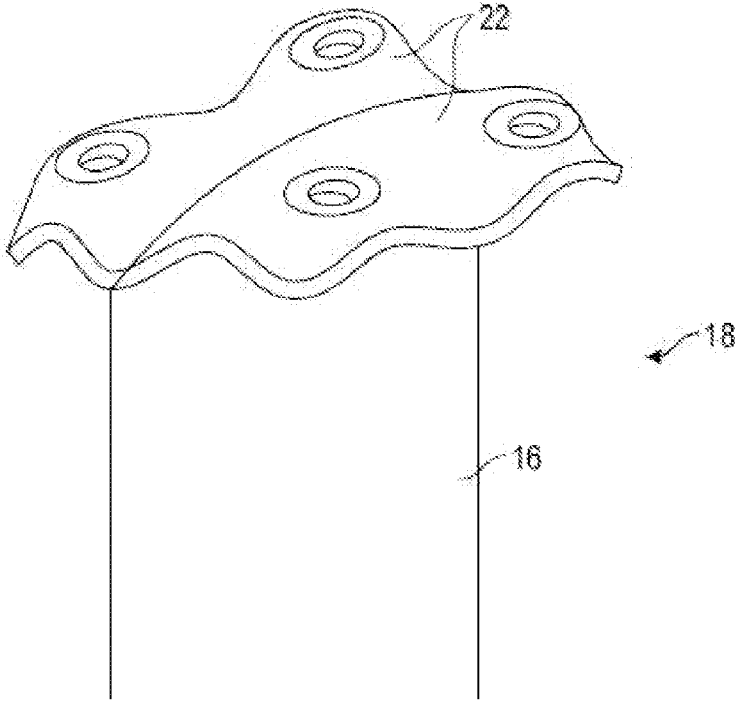

[Fig.5c-5d]
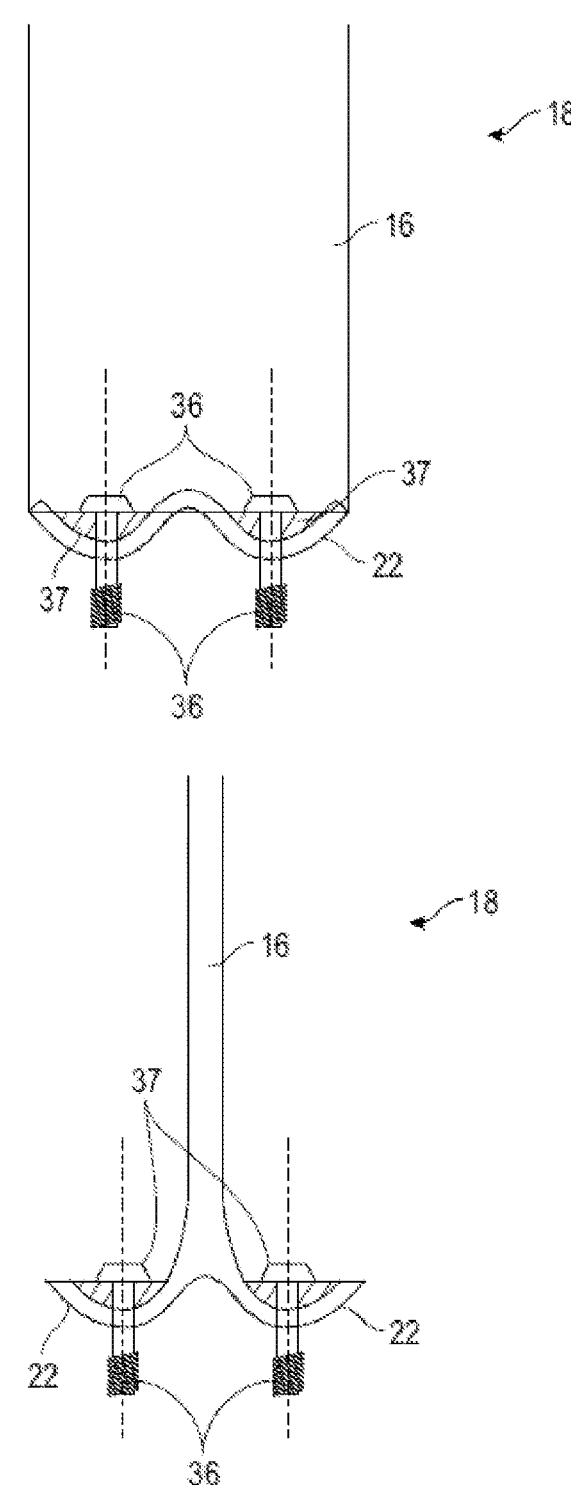

[Fig.6a]
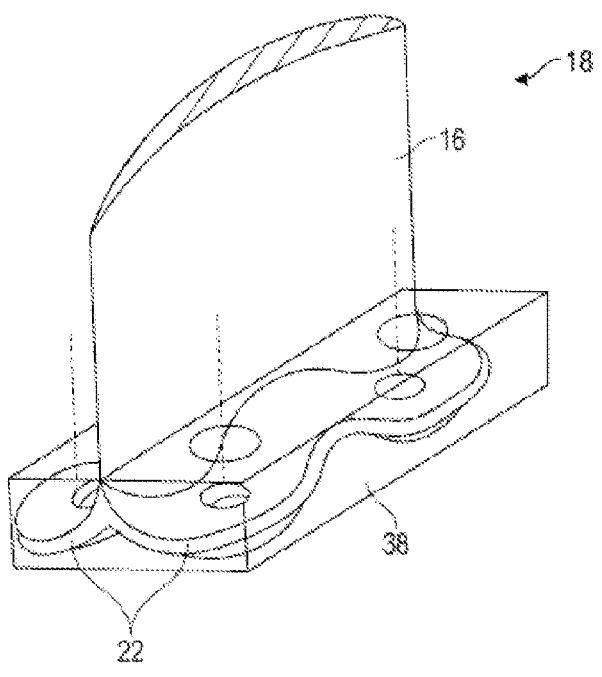
[Fig.6b]
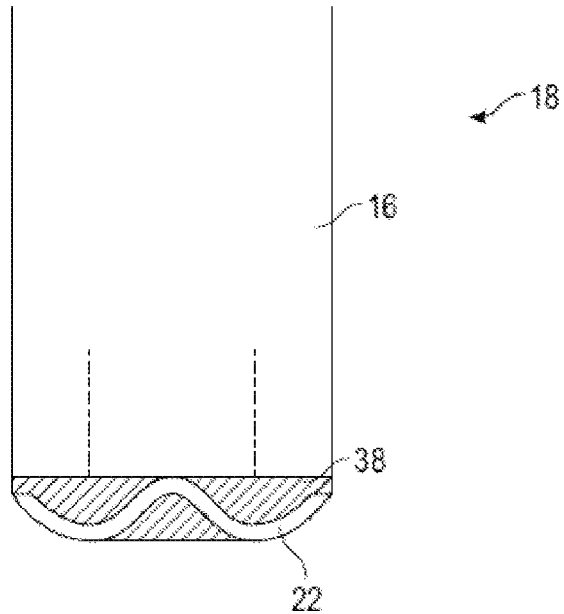

[Fig.7]
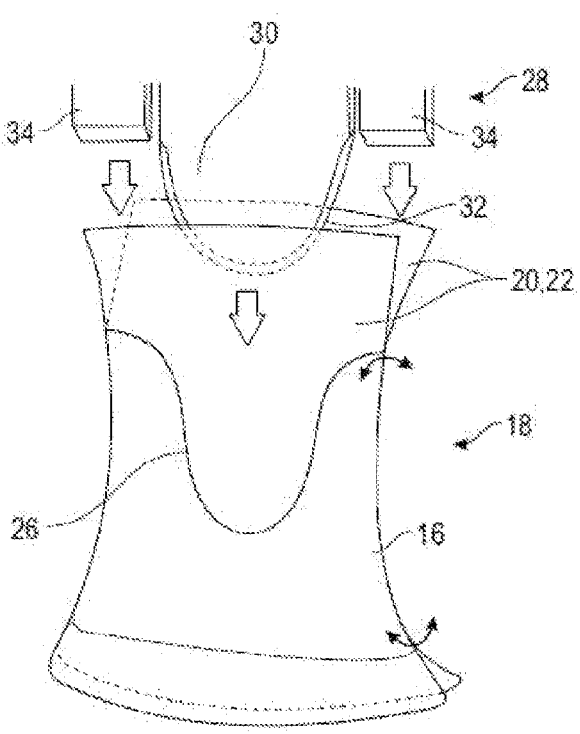
[Fig.8]
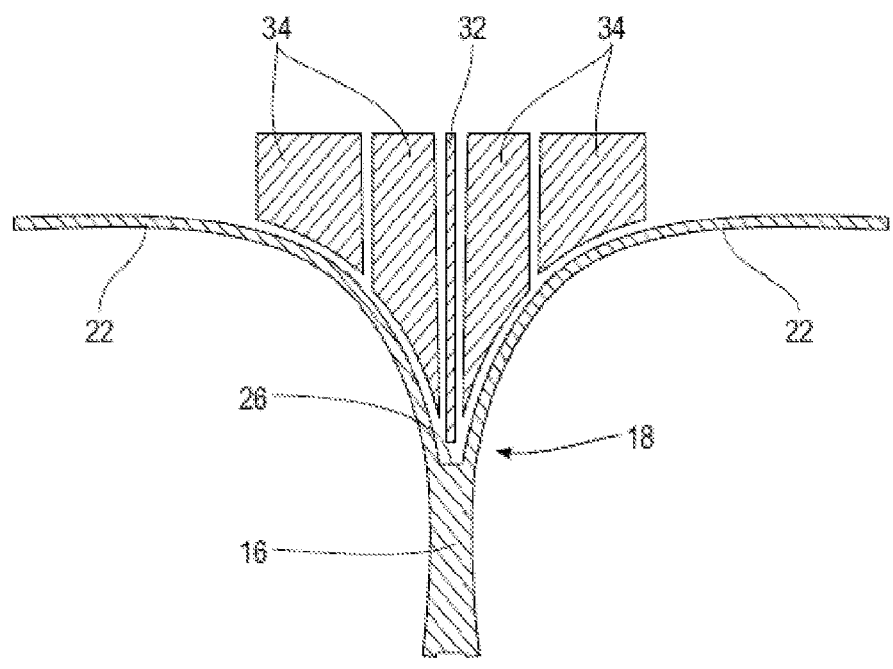

METHOD FOR PRODUCING A BLADED COMPONENT FOR AN AIRCRAFT TURBINE ENGINE

TECHNICAL FIELD OF THE INVENTION

This invention relates to a method for producing a bladed component for an aircraft turbine engine.

TECHNICAL BACKGROUND

The technical background includes the documents US-B2-10,532,521 and US-B2-11,141,938.

A bladed component of an aircraft turbine engine is, for example, a rotor vane or a stator vane. Such a component comprises a blade that has an aerodynamic profile and a generally elongated shape along an axis X, commonly referred to as the "stacking" axis in the technique under consideration. The component may comprise a platform at least one of the longitudinal ends of the blade along the aforementioned axis X. This platform extends in a direction transverse to the axis X, i.e., in a plane perpendicular to this axis.

FIG. 1 shows, for example, an air flow compressor stator vane which is a bladed component 10, the blade 12 of which is connected to a platform 14 at each of its longitudinal ends.

It is known and advantageous to produce a bladed component in composite material from a fibrous preform embedded in a polymer matrix obtained by polymerisation of a thermosetting resin or consolidation of a thermoplastic resin.

In this case, the preform can be made by three-dimensional weaving of fibres forming weft threads and warp threads, or by stacking fiber mats. These fibres are impregnated with the resin, or this resin is injected into the preform after it has been shaped, for example using RTM technology, which stands for Resin Transfer Molding and is a well-known technique for producing a vane by injection-molding.

The document WO-A2-2013/088040 describes the production of bladed components from a three-dimensional woven preform.

In the case of the implementation of a bladed component equipped with one or more platforms, it is described in this document that portions of the preform can be located in the platform by carrying out at least one disconnect of the preform.

In the present application, a disconnect means separating a unitary structure into two independent sub-structures. In the example shown in FIG. 2, the central part 16 of the preform 18 remains unitary and the end parts 20 of the preform 18 are each separated into two portions 22 by a disconnect of the preform 18. Each of the portions 22 may comprise several layers of fibres. The portions 22 are thus separated from each other and bent to orient them in a direction perpendicular to the axis X of the central part 16. The two portions 22 located at one longitudinal end of the preform 18 are intended to form one of the platforms 14 or to be integrated into this platform, and the two portions 22 located at the opposite longitudinal end of the preform 18 are intended to form the other platform 14 or to be integrated into this other platform.

FIG. 3a illustrates a disconnect as carried out in the current technique. At each of the end parts 20 of the preform 18, the disconnect is carried out so that the portions 22 are connected together, at the junction between the first and second parts 20, by a connecting line 24 which is rectilinear and can extend perpendicularly to the axis X.

The inventors have found that this straight or rectilinear line 24 creates a preferred axis of rotation or deformation for the bladed component 10, which therefore tends to deform around this line when subjected to operating stresses (aerodynamic pressures, forces from the structure of the engine, etc.). This deformation is undesirable and can affect the life of the bladed component 10 and the performances of the turbine engine.

The present invention proposes a simple, effective and economical solution to this problem.

SUMMARY OF THE INVENTION

The present invention relates to a method for producing a bladed component for an aircraft turbine engine, this bladed component comprising a blade having a stacking axis and at least one longitudinal end of which is connected to a transverse platform, the method comprising the steps of:

a) producing a fibrous preform, this preform having a generally elongate shape along said axis and being flat, this preform comprising a first part intended to form the blade and at least one second part which is situated at a longitudinal end of the preform and which is intended to form a platform, this second part of the preform comprising a disconnect defining two superimposed portions separated by a disconnect surface substantially parallel to the axis X, b) folding the portions respectively on two opposite sides of the first part, and c) stiffening the preform, characterized in that, in step a), the disconnect is such that the portions are connected together, at the junction between the first and second parts, by a connecting line which has a generally undulating shape.

The undulating shape, for example sinusoidal, of the connecting line eliminates the axis of rotation or deformation mentioned above and thus stiffens the connection between the platform and the blade. The bladed component thus has improved mechanical strength and service life.

The method according to the invention may comprise one or more of the following characteristics or steps, taken alone or in combination with one another:

the connecting line comprises at least one or three undulation antinodes;

step a) is carried out by three-dimensional weaving of fibers forming weft threads and warp threads, the warp threads extending along the axis X and the weft threads extending perpendicularly to the axis, the weft threads extending continuously in the first part and extending discontinuously in the second part and being interrupted at said disconnect surface;

step c) is carried out by injecting resin into the preform and polymerizing this resin;

step a) is carried out by stacking fiber mats, the fiber mats extending along the axis X;

step c) is carried out by thermocompression of the preform, the fibers of which have previously been impregnated with a resin;

the connecting line has an amplitude of between 2 and 20 mm, and preferably between 5 and 10 mm;

it comprises, between steps b) and c), a step of forming the preform;

the method comprises a subsequent step d) of forming the platform, either by mounting and attaching elements to the portions, or by overmolding these portions.

BRIEF DESCRIPTION OF THE FIGURES

Further characteristics and advantages of the invention will become apparent from the following detailed description, for the understanding of which reference is made to the attached drawings in which:

FIG. 1 is a schematic perspective view of a bladed component of aircraft turbine engine, in this case an air flux stator vane;

FIG. 2 is a very schematic view of a preform whose end parts have undergone a disconnect;

FIGS. 3a and 3b show preforms with disconnects, according to the previous technique in FIG. 3a and according to the invention in FIG. 3b;

FIG. 4 is a partial schematic view of a preform with several variants of embodiment of a disconnect according to the invention;

FIGS. 5a and 5b are schematic perspective views of a preform which has undergone a disconnect in accordance with the invention, as well as consolidation;

FIGS. 5c and 5d are cross-sections along lines A-A and B-B of FIG. 5a;

FIG. 6a is a schematic perspective view of a bladed component in accordance with the invention, with an over-molding;

FIG. 6b is a sectional view along lines A-A of FIG. 6a;

FIG. 7 is a schematic perspective view of a preform being disconnected by a tool such as a set of leaves; and FIG. 8 is another schematic cross-sectional view of the preform and tool of FIG. 7.

DETAILED DESCRIPTION OF THE INVENTION

FIGS. 1 and 2 may be considered as illustrating a bladed component 10 within the meaning of the invention.

This bladed component 10 comprises a blade 12 with a stacking axis X, at least one longitudinal end of which is connected to a transverse platform 14. The invention relates to a method for producing this bladed component, which comprises the steps of:

a) producing a fibrous preform 18, this preform 18 having a generally elongated and flat shape, this preform 18 comprising a first part 16 intended to form the blade 12 and at least one second part 20 which is situated at one longitudinal end of the preform 18 and which is intended to form a platform 14, this second part of the preform 18 comprising a disconnect defining two superimposed portions 22 separated by a disconnect surface substantially parallel to the axis X, this disconnect being carried out so that the portions 22 are connected together, at the junction between the first and second parts, by a connecting line 26 which has a generally undulating shape (see FIG. 3b), b) folding the portions 22 respectively on two opposite sides of the first part 16 (see FIG. 2), and c) stiffening the preform.

Y is defined as an axis perpendicular to X. The preform 18 extends in the plane XY.

An undulating connecting line 26 means that, in the plane XY, the value of X varies along the axis Y.

FIG. 4 shows several variants of the undulating connecting line 26. It can be seen that the line 26 may comprise several undulation antinodes, for example between 2 and 3. This figure also shows that the amplitude T1, T2 of the undulations can vary and is, for example, between 2 and 20 mm, and preferably between 5 and 10 mm. For example, the bladed component has a length along the axis X of between 10 and 500 mm, and preferably between 50 and 200 mm.

In step a), the preform can be made by three-dimensional weaving of fibers, in particular carbon fibers, forming weft threads and warp threads, for example by means of a loom of the Jacquard type. The warp threads extend along the axis X and the weft threads extend perpendicular to the axis X, as shown in FIG. 2. Step b) is then carried out by cutting the weft threads at the disconnect surface using a cutting tool 28.

In this configuration, there is a part where the preform is woven through its entire thickness and a part where the definition of the weave means that no weft thread crosses the plane of the disconnect surface. The portions on either side of this plane are therefore not linked together.

FIGS. 7 and 8 show an example of a tool used to open the disconnect.

The tool comprises several leaves 30, 34 superimposed and capable of sliding over each other.

The principle of the leaves 30, 34 is to help form the disconnect by progressively unfolding the two portions 22 of the preform so as to create the desired radii for connecting the blade to the platform, without undulating the preform. In practice, we start by inserting a leaf 30 between the two disconnected portions of the preform. Then, additional leaves 34 with edges 32 in the shape of the desired radius are then inserted on each side, taking care not to create any folds in the preform, for example by manually unfolding the preform and applying a slight pull in the direction of unfolding. There may be several "leaves" in this case, and it is preferable always to start from the center towards the outside of the radius to avoid creases.

The step c) of stiffening the preform 18 is preferably carried out by injecting resin into the preform, which has been previously positioned in a mold. The technology employed here may be of the RTM type, or of another type (known to the person skilled in the art) chosen from Vacuum Assisted Resin Transfer Molding (VARTM), Compression Resin Transfer Molding (CRTM), polyflex, etc.

The polymerization of the resin allows the preform to harden and stiffen completely.

Alternatively, the step a) can be carried out by stacking fiber mats. The fiber mats extend along the axis X and are stacked along an axis perpendicular to the plane XY. The disconnect is achieved during stacking, avoiding a securing of the fiber mats making up one of the portions 22, with the fiber mats making up the other portion 22.

The fibers used to make the preform can be continuous or discontinuous, impregnated or non-impregnated. When fiber mats are used, the mats can be formed by pre-impregnated long staple fibers, by randomly arranged unidirectional fiber coupons, etc.

In this case, the step c) of stiffening the preform 18 is preferably carried out by thermocompression of the preform 18. This step may include a preliminary sub-step of humidifying the preform. This step of humidification may allow softening of a coating substance of the fibers intended to facilitate weaving. The thermocompression then allows the substances of the fibers to be mixed together and thus bind the fibers of the preform, helping to stiffen it after cooling. The resin can be a thermosetting or thermoplastic resin (epoxy—e.g. PR520, bismaleide, etc.). The fibers of the preform 18 are preferably made of carbon. The injection of the resin and even thermocompression are carried out in a mold, preferably in two separate molds. Said or each mold comprises a recessed cavity for receiving the preform 18.

Between the steps b) and c) above, the method according to the invention may comprise a step of forming the preform.

This step is optional and involves applying pressure to the preform to shape it. This operation may be accompanied by heating, it may also be carried out on a preform that has been wetted with water, or it may be carried out by pulling the vacuum to remove the moisture. This step stabilizes the preform before it is tipped into the injection or thermocompression mold.

FIGS. 5*a* to 5*d* allow you to view the stiffened preform 18. Because of the undulating shape of the connecting line 26, the portions 22 located on either side of the blade 16 also have an undulating shape in three dimensions. Each of these portions 22 can be drilled to receive a screw 36 for attaching the bladed component. Each of these portions 22 can also receive at least one add-on component 37 to form the platform 12 or can receive an overmolding 38 to form this platform, as shown in FIGS. 6*a* and 6*b*.

The method according to the invention allows a greater stiffness and a greater moment of inertia of the connection of the blade to the platform of the bladed component. During operation, the bladed component is subjected to aerodynamic forces (air pressure on the blade) and structural forces (relative movements with casings). These forces are transmitted from the platforms to the blade or vice versa. The stiffening of the junction between the blade and the platform (s) allows the risk of deformation of the bladed component to be limited, thus optimizing the performances of the engine.

The invention claimed is:

1. A method for producing a bladed component for an aircraft turbine engine, this bladed component comprising a blade having a stacking axis and having at least one longitudinal end connected to a transverse platform, the method comprising the steps of:

a) producing a fibrous preform, the preform having a generally elongate shape along said axis and being flat, the preform comprising a first part that is intended to form the blade and at least one second part which is situated at a longitudinal end of the preform and which is intended to form the transverse platform, the second part of the preform comprising a disconnect defining two superimposed portions separated by a disconnect surface substantially parallel to the axis, b) folding the portions respectively on two opposite sides of the first part, and c) stiffening the preform, wherein, in step a), the disconnect is such that the portions are connected together, at a junction between the first and second parts, by a connecting line which has a generally undulating shape.

2. The method according to claim 1, wherein the connecting line comprises at least one or three undulation antinodes.

3. The method according to claim 1, wherein step a) is carried-out by three-dimensional weaving of fibers forming weft threads and warp threads, the warp threads extending along the axis and the weft threads extending perpendicularly to the axis, the weft threads extending continuously in the first part and extending discontinuously in the second part and being interrupted at said disconnect surface.

4. The method according to claim 3, wherein step c) is carried out by injecting resin into the preform and polymerizing the resin.

5. The method according to claim 1, wherein step a) is carried out by stacking fiber mats, the fiber mats extending along the axis.

6. The method according to claim 5, wherein step c) is carried out by thermocompression of the preform, the fibers of which are previously impregnated with a resin.

7. The method according to claim 1, wherein the connecting line has an amplitude (T1, T2) of between 2 and 20 mm.

8. The method according to claim 1, wherein the method comprises, between steps b) and c), a step of forming the preform.

9. The method according to claim 1, wherein the method comprises a subsequent step d) of forming the platform, either by mounting and attaching elements to the portions, or by overmolding the portions.

10. The method according to claim 1, wherein the connecting line has an amplitude (T1, T2) of between 5 and 10 mm.

\* \* \* \* \*